(12) United States Patent
Kubo et al.

(10) Patent No.: US 12,139,414 B2
(45) Date of Patent: *Nov. 12, 2024

(54) METHOD FOR PRODUCING HALIDE

(71) Applicant: Panasonic Intellectual Property Management Co., Ltd., Osaka (JP)

(72) Inventors: Takashi Kubo, Hyogo (JP); Yusuke Nishio, Osaka (JP); Koki Ueno, Osaka (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 717 days.

This patent is subject to a terminal disclaimer.

(21) Appl. No.: 17/323,925

(22) Filed: May 18, 2021

(65) Prior Publication Data

US 2021/0269320 A1 Sep. 2, 2021

Related U.S. Application Data

(63) Continuation of application No. PCT/JP2019/025436, filed on Jun. 26, 2019.

(30) Foreign Application Priority Data

Dec. 26, 2018 (JP) ................................. 2018-243603

(51) Int. Cl.
*C01D 15/04* (2006.01)

(52) U.S. Cl.
CPC .......... *C01D 15/04* (2013.01); *C01P 2006/40* (2013.01)

(58) Field of Classification Search
None
See application file for complete search history.

(56) References Cited

U.S. PATENT DOCUMENTS

| | | | | |
|---|---|---|---|---|
| 3,855,087 | A * | 12/1974 | Yamanaka | C25C 3/36 205/363 |
| 9,592,541 | B2 * | 3/2017 | Bruck | B23K 26/144 |
| 2011/0272585 | A1 | 11/2011 | Yang et al. | |
| 2016/0103232 | A1 | 4/2016 | Ouspenski et al. | |
| 2017/0139059 | A1 | 5/2017 | Ouspenski et al. | |
| 2018/0246230 | A1 | 8/2018 | Ouspenski et al. | |
| 2019/0088995 | A1 | 3/2019 | Asano et al. | |
| 2019/0097267 | A1 | 3/2019 | Yokoyama et al. | |
| 2019/0107636 | A1 | 4/2019 | Ouspenski et al. | |
| 2019/0245240 | A1 | 8/2019 | Park et al. | |
| 2020/0212481 | A1 | 7/2020 | Nagamine et al. | |
| 2020/0335817 | A1 | 10/2020 | Asano et al. | |

FOREIGN PATENT DOCUMENTS

| | | |
|---|---|---|
| CN | 101635203 * | 1/2010 |
| CN | 107794566 A | 3/2018 |
| CN | 108004591 | 5/2018 |
| CN | 108701860 A | 10/2018 |
| CN | 108899580 A | 11/2018 |
| CN | 109075390 A | 12/2018 |
| CN | 111279432 A | 6/2020 |
| CN | 111295789 A | 6/2020 |
| DE | 102013201376 * | 7/2014 |
| EP | 3496202 A1 | 6/2019 |
| EP | 3736820 A1 | 11/2020 |
| EP | 3736831 A4 | 3/2021 |
| EP | 3736833 A4 | 3/2021 |
| EP | 3736834 A4 | 3/2021 |
| EP | 3736897 A4 | 3/2021 |
| EP | 3745422 A4 | 3/2021 |
| JP | 2016-522135 | 7/2016 |
| JP | 2017-168395 A | 9/2017 |
| JP | 2017-220339 | 12/2017 |
| WO | 2018/025582 | 2/2018 |
| WO | 2018/062770 A1 | 4/2018 |

OTHER PUBLICATIONS

International Search Report of PCT application No. PCT/JP2019/025436 dated Oct. 1, 2019.
Andreas Bohnsack et al., "The bromides Li3MBr6 (M=Sm-Lu, Y): Synthesis, Crystal Structure, and Ionic Mobility", Journal of inorganic and General Chemistry, 1997.09, vol. 623/Issue 9, pp. 1352-1356.
Andreas Bohnsack et al., "Ternary Chlorides of the Rare-Earth Elements with Lithium, Li3MCl6 (M=Tb-Lu, Y, Sc): Synthesis, Crystal Structures, and Ionic Motion", Journal of inorganic and General Chemistry, 1997.07, vol. 623/Issue 7, pp. 1067-1073.
H.-J. Steiner et al., "Novel Fast Ion Conductors of the Type MI3MIIICl6 (Ml=Li, Na, Ag; MIII=In, Y)", Zeitschrift fur anorganische und allgemeine Chemie, Jul. 1992, vol. 613, pp. 26-30 (Partial Translation).
English Translation of Chinese Search Report dated Dec. 5, 2022 for the related Chinese Patent Application No. 201980062307.5.
English Translation of Chinese Search Report dated Dec. 28, 2022 for the related Chinese Patent Application No. 201980060798.X.
The Indian Office Action dated Dec. 29, 2022 for the related Indian Patent Application No. 202147024385.

(Continued)

*Primary Examiner* — Sheng H Davis

(74) *Attorney, Agent, or Firm* — Rimon P.C.

(57) ABSTRACT

A production method for producing a halide includes heat-treating, in an inert gas atmosphere, a mixed material in which LiX, $YZ_3$, and at least one of LiX' or $YZ'_3$ are mixed, where X is an element selected from the group consisting of Cl, Br, and I; Z is an element selected from the group consisting of Cl, Br, and I and different from X; X' is an element selected from the group consisting of Cl, Br, and I and different from either X or Z; and Z' is an element selected from the group consisting of Cl, Br, and I and different from either X or Z. In the heat-treatment, the mixed material is heat-treated at higher than or equal to 200° C. and lower than or equal to 650° C.

13 Claims, 4 Drawing Sheets

(56) References Cited

OTHER PUBLICATIONS

The Indian Office Action dated Jan. 20, 2023 for the related Indian Patent Application No. 202147024572.
The Extended European Search Report dated Jan. 21, 2022 for the related European Patent Application No. 19902576.8.
The Extended European Search Report dated Jan. 28, 2022 for the related European Patent Application No. 19901581.9.
The Extended European Search Report dated Jan. 13, 2022 for the related European Patent Application No. 19902261.7.
The Extended European Search Report dated Jan. 28, 2022 for the related European Patent Application No. 19902747.5.
The Extended European Search Report dated Jan. 14, 2022 for the related European Patent Application No. 19904337.3.
The Extended European Search Report dated Jan. 14, 2022 for the related European Patent Application No. 19905741.5.
Tetsuya Asano et al., "Solid Halide Electrolytes with High Lithium-Ion Conductivity for Application in 4 V Class Bulk-Type All-Solid-State Batteries", Advanced Materials, vol. 30, No. 44, Sep. 14, 2018 (Sep. 14, 2018), pp. 1-7, KP055721991.
Kwon Young-Soon et al., "Ball temperatures during mechanical alloying in planetary mills", Journal of Alloys and Compounds, vol. 346, No. 1, Jan. 1, 2002 (Jan. 1, 2002), pp. 276-281, XP085622434.
English Translation of Chinese Search Report dated Mar. 30, 2023 for the related Chinese Patent Application No. 201980066255.9.
English Translation of Chinese Search Report dated Aug. 11, 2023 for the related Chinese Patent Application No. 201980069385.8.

\* cited by examiner

METHOD FOR PRODUCING HALIDE

BACKGROUND

1. Technical Field

The present disclosure relates to a production method for producing a halide.

2. Description of the Related Art

International Publication No. 2018/025582 discloses a production method for producing a halide solid electrolyte.

SUMMARY

In existing technology, it is desired to produce a halide by a method having industrially high productivity.

In one general aspect, the techniques disclosed here feature a production method for producing a halide including heat-treating, in an inert gas atmosphere, a mixed material in which LiX, $YZ_3$, and at least one of LiX' or $YZ'_3$ are mixed, where X is an element selected from the group consisting of Cl, Br, and I; Z is an element selected from the group consisting of Cl, Br, and I and different from X; X' is an element selected from the group consisting of Cl, Br, and I and different from either X or Z; and Z' is an element selected from the group consisting of Cl, Br, and I and different from either X or Z, in which the mixed material is heat-treated at higher than or equal to 200° C. and lower than or equal to 650° C.

According to the present disclosure, a halide can be produced by a method having industrially high productivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will be described below with reference to the drawings.

Embodiment 1

Figure 1:
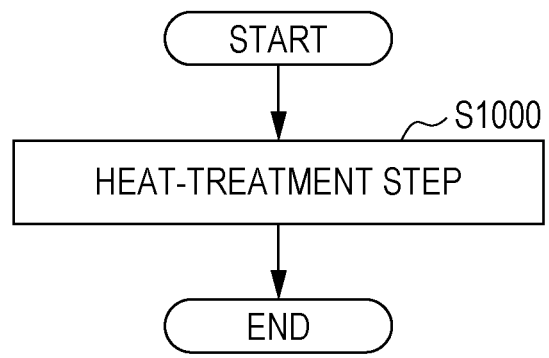
FIG. 1 is a flowchart showing an example of a production method in Embodiment 1.

FIG. 1 is a flowchart showing an example of a production method in Embodiment 1.

A production method in Embodiment 1 includes a heat-treatment step S1000.

The heat-treatment step S1000 is a step of heat-treating a mixed material in an inert gas atmosphere. The mixed material heat-treated in the heat-treatment step S1000 is a material in which LiX and $YZ_3$ are mixed, where X is an element selected from the group consisting of Cl, Br, and I, and Z is an element selected from the group consisting of Cl, Br, and I. In the heat-treatment step S1000, the mixed material is heat-treated at higher than or equal to 200° C. and lower than or equal to 650° C.

According to the structure described above, a halide can be produced by a method having industrially high productivity (e.g., a method enabling low-cost mass production). That is, without using a vacuum-sealed tube and a planetary ball mill, a halide containing Li (i.e., lithium) and Y (i.e., yttrium) can be produced by a simple and easy production method (i.e., heat-treatment in an inert gas atmosphere).

In the heat-treatment step S1000, for example, powder of the mixed material may be placed in a container (e.g., a crucible) and heat-treated in a heating furnace. In this case, the state in which the mixed material is heated to a temperature of "higher than or equal to 200° C. and lower than or equal to 650° C." in an inert gas atmosphere may be held for more than or equal to a predetermined time. Furthermore, the heat-treatment time may be a time period that does not cause a compositional change of a heat-treated product due to volatilization of a halide or the like (i.e., does not impair the ionic conductivity of the heat-treated product).

Note that as the inert gas, helium, nitrogen, argon, or the like can be used.

Furthermore, after the heat-treatment step S1000, the heat-treated product may be taken out of the container (e.g., a crucible) and pulverized. In this case, the heat-treated product may be pulverized with a pulverizing apparatus (e.g., a mortar, mixer, or the like).

Furthermore, the mixed material in the present disclosure may be further mixed with another material different from LiX or $YZ_3$, in addition to LiX and $YZ_3$.

Furthermore, in the present disclosure, the mixed material may be further mixed with $M_\alpha A_\beta$, where M includes at least one element selected from the group consisting of Na, K, Ca, Mg, Sr, Ba, Zn, In, Sn, Bi, La, Ce, Pr, Nd, Pm, Sm, Eu, Gd, Tb, Dy, Ho, Er, Tm, Yb, and Lu; A is at least one element selected from the group consisting of Cl, Br, and I; and $\alpha>0$ and $\beta>0$ are satisfied.

According to the structure described above, it is possible to improve the properties (e.g., ionic conductivity and the like) of a halide produced by the production method of the present disclosure.

Note that, when "$\alpha=1$", "$2\leq\beta\leq5$" may be satisfied.

Furthermore, in the present disclosure, the mixed material may be further mixed with at least one of LiF or $YF_3$.

According to the structure described above, it is possible to improve the properties (e.g., ionic conductivity and the like) of a halide produced by the production method of the present disclosure.

Furthermore, in the present disclosure, the mixed material may be mixed with a material in which a part of Li in LiX (or a part of Y in $YZ_3$) is replaced with substituting cation species (e.g., M described above). Furthermore, the mixed material may be mixed with a material in which a part of X in LiX (or a part of Z in $YZ_3$) is replaced with F (i.e., fluorine).

Figure 2:
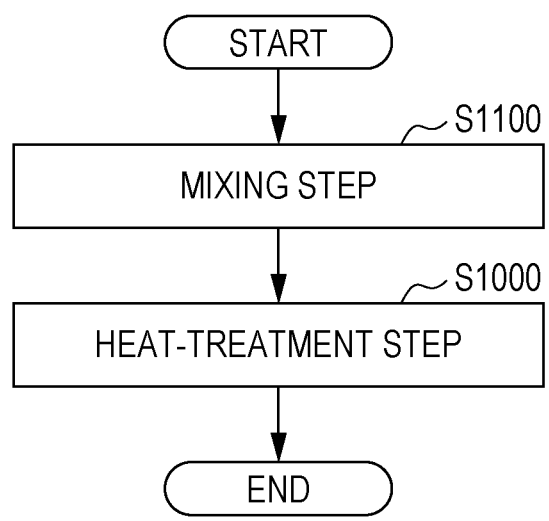
FIG. 2 is a flowchart showing an example of the production method in Embodiment 1.

FIG. 2 is a flowchart showing an example of the production method in Embodiment 1. As shown in FIG. 2, the production method in Embodiment 1 may further include a mixing step S1100.

The mixing step S1100 is a step carried out before the heat-treatment step S1000. In the mixing step S1100, a mixed material (i.e., a material to be heat-treated in the heat-treatment step S1000) is obtained by mixing LiX and YZ$_3$ serving as starting materials.

In the mixing step S1100, LiX and YZ$_3$ may be weighed so as to have a desired molar ratio and mixed. As the mixing method for mixing the starting materials, a method in which a commonly known mixing apparatus (e.g., a mortar, blender, ball mill, or the like) is used may be employed. For example, in the mixing step S1100, powders of the starting materials may be prepared and mixed. In this case, in the heat-treatment step S1000, a mixed material in the form of powder may be heat-treated. Furthermore, the mixed material in the form of powder obtained in the mixing step S1100 may be shaped into pellets by uniaxial pressing. In this case, in the heat-treatment step S1000, by heat-treating the mixed material in the form of pellets, a halide may be produced.

Furthermore, in the mixing step S1100, a mixed material may be obtained by mixing, in addition to LiX and YZ$_3$, another starting material different from LiX or YZ$_3$ (e.g., M$_\alpha$A$_\beta$, LiF, YF$_3$, or the like described above).

Note that in the mixing step S1100, a mixed material may be obtained by mixing "a starting material containing LiX as a main component" and "a starting material containing YZ$_3$ as a main component".

Figure 3:
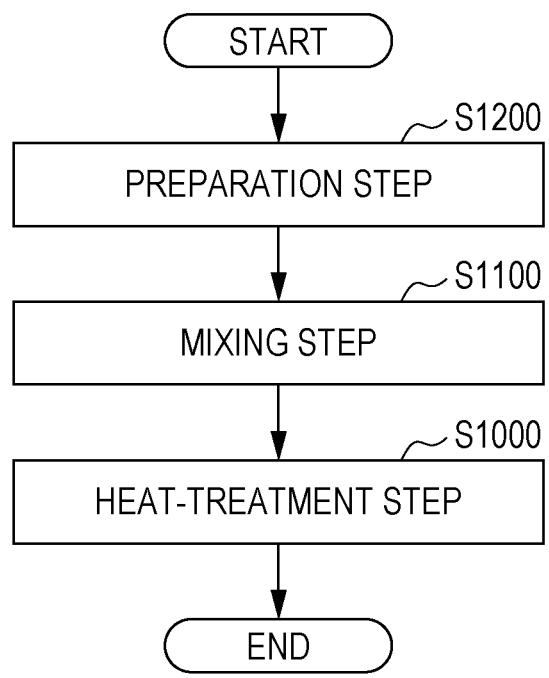
FIG. 3 is a flowchart showing an example of the production method in Embodiment 1.

FIG. 3 is a flowchart showing an example of the production method in Embodiment 1. As shown in FIG. 3, the production method in Embodiment 1 may further include a preparation step S1200.

The preparation step S1200 is a step carried out before the mixing step S1100. In the preparation step S1200, starting materials such as LiX and YZ$_3$ (i.e., materials to be mixed in the mixing step S1100) are prepared.

In the preparation step S1200, starting materials such as LiX and YZ$_3$ may be obtained by synthesizing materials. Alternatively, in the preparation step S1200, commonly known, commercially available products (e.g., materials with a purity of greater than or equal to 99%) may be used. Note that dry materials may be used as the starting materials. Furthermore, starting materials in the form of crystals, aggregates, flakes, powder, or the like may be used as the staring materials. In the preparation step S1200, starting materials in the form of powder may be obtained by pulverizing starting materials in the form of crystals, aggregates, or flakes.

In the preparation step S1200, any one or two or more of M$_\alpha$A$_\beta$ (where M is at least one element selected from the group consisting of Na, K, Ca, Mg, Sr, Ba, Zn, In, Sn, Bi, La, Ce, Pr, Nd, Pm, Sm, Eu, Gd, Tb, Dy, Ho, Er, Tm, Yb, and Lu; A is at least one element selected from the group consisting of Cl, Br, and I; and when "$\alpha=1$", "$2 \leq \beta \leq 5$" is satisfied), LiF, and YF$_3$ may be added. In this way, it is possible to improve the properties (e.g., ionic conductivity and the like) of a halide obtained by the production method of the present disclosure.

Note that in the preparation step S1200, a starting material in which a part of Li in LiX (or a part of Y in YZ$_3$) is replaced with substituting cation species (e.g., M described above) may be prepared. Furthermore, in the preparation step S1200, a starting material in which a part of X in LiX (or a part of Z in YZ$_3$) is replaced with F (i.e., fluorine) may be prepared.

Note that the halide produced by the production method of the present disclosure can be used as a solid electrolyte material. In this case, the solid electrolyte material may be, for example, a solid electrolyte having lithium ion conductivity. In this case, the solid electrolyte material can be used, for example, as a solid electrolyte material used in all-solid-state lithium secondary batteries.

Embodiment 2

Embodiment 2 will be described below. Descriptions that are duplicate of those in Embodiment 1 will be omitted appropriately.

A production method in Embodiment 2 has the following feature in addition to the feature of the production method in Embodiment 1 described above.

In the production method in Embodiment 2, the mixed material is a material in which, in addition to LiX and YZ$_3$, at least one of LiX' or YZ'$_3$ is further mixed.

That is, in the production method in Embodiment 2, the mixed material may be a material in which, in addition to LiX and YZ$_3$, LiX' is further mixed, where X is an element selected from the group consisting of Cl, Br, and I and different from either X or Z; and Z is an element different from X.

That is, the mixed material heat-treated in the heat-treatment step S1000 of the production method in Embodiment 2 is "a material in which LiCl (i.e., lithium chloride), YBr$_3$ (i.e., yttrium bromide), and LiI (i.e., lithium iodide) are mixed", "a material in which LiBr (i.e., lithium bromide), YI$_3$ (i.e., yttrium iodide), and LiCl are mixed", or "a material in which LiI, YCl$_3$ (i.e., yttrium chloride), and LiBr are mixed".

In other words, in the production method in Embodiment 2, the heat-treatment step S1000 is a step of heat-treating "a mixed material in which LiCl, YBr$_3$, and LiI are mixed", "a mixed material in which LiBr, YI$_3$, and LiCl are mixed", or "a mixed material in which LiI, YCl$_3$, and LiBr are mixed" in an inert gas atmosphere.

According to the structure described above, a halide can be produced by a method having industrially high productivity. That is, without using a vacuum-sealed tube and a planetary ball mill, a halide (i.e., a compound containing Cl, Br, and I) containing Li and Y can be produced by a simple and easy production method (i.e., heat-treatment in an inert gas atmosphere).

Furthermore, in the production method in Embodiment 2, the mixed material may be further mixed with LiZ.

In other words, in the production method in Embodiment 2, the heat-treatment step S1000 may be a step of heat-treating "a mixed material in which LiCl, YBr$_3$, LiI, and LiBr are mixed", "a mixed material in which LiBr, YI$_3$, LiCl, and LiI are mixed", or "a mixed material in which LiI, YCl$_3$, LiBr, and LiCl are mixed" in an inert gas atmosphere.

According to the structure described above, by mixing of LiZ, an adjustment in which the amount of Li is set to be more excessive with respect to Y can be easily performed. That is, a Li-excess composition of the halide to be produced can be easily achieved.

Furthermore, in the production method in Embodiment 2, the mixed material may be a material in which, in addition to LiX and YZ$_3$, YZ'$_3$ is further mixed, where Z' is an element selected from the group consisting of Cl, Br, and and different from either X or Z; and Z is an element different from X.

That is, the mixed material heat-treated in the heat-treatment step S1000 of the production method in Embodiment 2 is "a material in which LiCl, YBr$_3$, and YI$_3$ are mixed", "a material in which LiBr, YI$_3$, and YCl$_3$ are mixed", or "a material in which LiI, YCl$_3$, and YBr$_3$ are mixed".

In other words, in the production method in Embodiment 2, the heat-treatment step S1000 is a step of heat-treating "a mixed material in which LiCl, YBr$_3$, and YI$_3$ are mixed", "a mixed material in which LiBr, YI$_3$, and YCl$_3$ are mixed", or "a mixed material in which LiI, YCl$_3$, and YBr$_3$ are mixed" in an inert gas atmosphere.

According to the structure described above, a halide can be produced by a method having industrially high productivity. That is, without using a vacuum-sealed tube and a planetary ball mill, a halide (i.e., a compound containing Cl, Br, and I) containing Li and Y can be produced by a simple and easy production method (i.e., heat-treatment in an inert gas atmosphere).

Furthermore, in the production method in Embodiment 2, the mixed material may be further mixed with YX$_3$.

In other words, in the production method in Embodiment 2, the heat-treatment step S1000 may be a step of heat-treating "a mixed material in which LiCl, YBr$_3$, YI$_3$, and YCl$_3$ are mixed", "a mixed material in which LiBr, YI$_3$, YC$_3$, and YBr$_3$ are mixed", or "a mixed material in which LiI, YC$_3$, YBr$_3$, and YI$_3$ are mixed" in an inert gas atmosphere.

According to the structure described above, by mixing of YX$_3$, an adjustment in which the amount of Li is set to be more deficient with respect to Y can be easily performed. That is, a Li-deficient composition of the halide to be produced can be easily achieved.

Furthermore, in the production method in Embodiment 2, the mixed material may be a material in which, in addition to LiX and YZ$_3$, both LiX' and YZ'$_3$ are further mixed. In this case, the mixed material may be further mixed with at least one of LiZ or YX$_3$. For example, the mixed material may be further mixed with both LiZ and YX$_3$.

Furthermore, in the heat-treatment step S1000 of the production method in Embodiment 2, the mixed material may be heat-treated at higher than or equal to 200° C. and lower than or equal to 500° C.

According to the structure described above, a halide having high ionic conductivity can be produced by a method having industrially high productivity. That is, by setting the heat-treatment temperature to be higher than or equal to 200° C., "LiX, YZ$_3$, and LiX'" or "LiX, YZ$_3$, and YZ'$_3$" are allowed to react with one another sufficiently. Furthermore, by setting the heat-treatment temperature to be lower than or equal to 500° C., it is possible to suppress thermal decomposition of a halide formed by a solid phase reaction. Thus, the ionic conductivity of a halide, which is a heat-treated product, can be further enhanced. That is, for example, a higher-quality halide solid electrolyte can be obtained.

Furthermore, by setting the heat-treatment temperature to be lower than or equal to 500° C., heat-treatment can be performed at a temperature equal to or lower than the melting point of LiI (i.e., 500° C.), and decomposition of LiI can be suppressed. (Note that the melting point of LiBr is about 550° C., and decomposition of LiBr can also be suppressed.) That is, it is possible to suppress decomposition of LiBr and LiI before completion of the solid phase reaction, and a compound having a desired composition can be synthesized.

Furthermore, in the heat-treatment step S1000 of the production method in Embodiment 2, the mixed material may be heat-treated at higher than or equal to 380° C. (e.g., higher than or equal to 380° C. and lower than or equal to 500° C.).

According to the structure described above, a halide having higher ionic conductivity can be produced by a method having industrially high productivity. That is, by setting the heat-treatment temperature to be higher than or equal to 380° C., the crystallinity of a halide, which is a heat-treated product, can be further enhanced. Thus, the ionic conductivity of a halide, which is a heat-treated product, can be further enhanced. That is, for example, a higher-quality halide solid electrolyte can be obtained.

Furthermore, in the heat-treatment step S1000 of the production method in Embodiment 2, the mixed material may be heat-treated for more than or equal to 1 hour and less than or equal to 24 hours.

According to the structure described above, a halide having higher ionic conductivity can be produced by a method having industrially high productivity. That is, by setting the heat-treatment time to be more than or equal to 1 hour, "LiX, YZ$_3$, and LiX'" or "LiX, YZ$_3$, and YZ'$_3$" are allowed to react with one another sufficiently. Furthermore, by setting the heat-treatment time to be less than or equal to 24 hours, volatilization of a halide, which is a heat-treated product, can be suppressed, and it is possible to obtain a halide having a desired compositional ratio of constituent elements (i.e., a compositional change can be suppressed). Thus, the ionic conductivity of a halide, which is a heat-treated product, can be further enhanced. That is, for example, a higher-quality halide solid electrolyte can be obtained.

Furthermore, in the heat-treatment step S1000 of the production method in Embodiment 2, the mixed material may be heat-treated for less than or equal to 10 hours (e.g., more than or equal to 1 hour and less than or equal to 10 hours).

According to the structure described above, by setting the heat-treatment time to be less than or equal to 10 hours, volatilization of a halide, which is a heat-treated product, can be further suppressed, and it is possible to obtain a halide having a desired compositional ratio of constituent elements (i.e., a compositional change can be suppressed). Thus, it is possible to further suppress a decrease in the ionic conductivity of a halide, which is a heat-treated product, due to a compositional change.

Furthermore, in the mixing step S1100 of the production method in Embodiment 2, the mixing molar ratio of "LiX, YZ$_3$, and LiX'" may be adjusted by weighing "LiX, YZ$_3$, and LiX'" so as to have a desired molar ratio, followed by mixing. Similarly, in the mixing step S1100 of the production method in Embodiment 2, the mixing molar ratio of "LiX, YZ$_3$, and YZ'$_3$" may be adjusted by weighing "LiX, YZ$_3$, and YZ'$_3$" so as to have a desired molar ratio, followed by mixing.

For example, in Embodiment 2, LiBr, LiI, YBr$_3$, and YCl$_3$ may be mixed at a molar ratio of LiBr:LiI:YBr$_3$:YCl$_3$=1:2:0.33:0.67. Thus, a compound with a composition of Li$_3$YBr$_2$Cl$_2$I$_2$ can be produced.

Furthermore, in the mixing step S1100 of the production method in Embodiment 2, the mixed material may be obtained by further mixing M$_\alpha$Cl$_\beta$ (i.e., a compound represented by M$_\alpha$A$_\beta$ in Embodiment 1 where "A" is Cl), M$_\alpha$Br$_\beta$ (i.e., a compound represented by M$_\alpha$A$_\beta$ in Embodiment 1 where "A" is Br), or M$_\alpha$I$_\beta$ (i.e., a compound represented by M$_\alpha$A$_\beta$ in Embodiment 1 where "A" is I), in addition to "LiX, YZ$_3$, and LiX'" or "LiX, YZ$_3$, and YZ'$_3$". In this case, in the preparation step S1200 of the production method in Embodiment 2, the M$_\alpha$Cl$_\beta$, the M$_\alpha$Br$_\beta$, or the M$_\alpha$I$_\beta$ may be prepared as a starting material.

Furthermore, in the preparation step S1200 of the production method in Embodiment 2, a starting material in which a part of Li in LiX' or LiZ (or a part of Y in YZ'$_3$ or YX$_3$) is replaced with substituting cation species (e.g., M in Embodiment 1 described above) may be prepared. Furthermore, in the preparation step S1200 of the production method in Embodiment 2, a starting material in which a part of X' in LiX' (or a part of Z' in YZ'$_3$) is replaced with F (i.e., fluorine) may be prepared. Furthermore, in the preparation step S1200 of the production method in Embodiment 2, a starting material in which a part of Z in LiZ (or a part of X in YX$_3$) is replaced with F (i.e., fluorine) may be prepared.

EXAMPLES

Details of the present disclosure will be described below using examples and a reference example. These are merely exemplary and do not limit the present disclosure. In the following examples, halides produced by a production method according to the present disclosure are produced as solid electrolyte materials and evaluated.

Example 1

(Production of Solid Electrolyte Material)
In an argon atmosphere with a dew point of lower than or equal to −60° C., LiBr, LiI, YBr$_3$, and YCl$_3$ were weighed so as to satisfy a molar ratio of LiBr:LiI:YBr$_3$:YCl$_3$=1:2:0.33:0.67. These materials were pulverized and mixed with a mortar made of agate. The resulting mixture was placed in a crucible made of alumina, heated to 440° C. in an argon atmosphere, and held for one hour. After heat-treatment, the material was pulverized with a mortar made of agate to produce a solid electrolyte material of Example 1.

Figure 4:
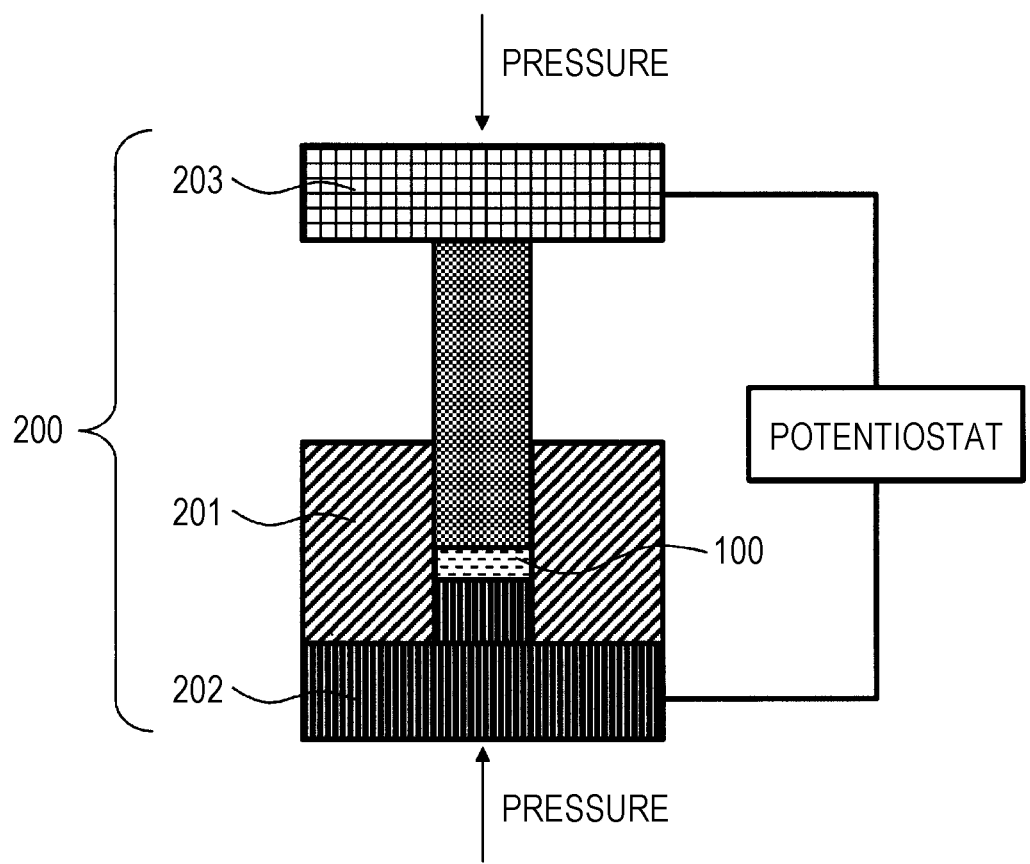
FIG. 4 is a schematic diagram showing a method for evaluating ionic conductivity.

(Evaluation of Ionic Conductivity)
FIG. 4 is a schematic diagram showing a method for evaluating ionic conductivity.

A pressure-molding die 200 includes a die 201 which is made of electronically insulating polycarbonate, and an upper punch 203 and a lower punch 202 which are made of electronically conductive stainless steel.

Ionic conductivity was evaluated by the following method using the structure shown in FIG. 4.

In a dry atmosphere with a dew point of lower than or equal to −60° C., the pressure-molding die 200 was filled with solid electrolyte powder 100, which is powder of the solid electrolyte material of Example 1, and uniaxial pressing was performed at 300 MPa to produce a conductivity measurement cell of Example 1. In the pressurized state, lead wires were extended from the upper punch 203 and the lower punch 202 and connected to a potentiostat (Princeton Applied Research, VersaSTAT4) equipped with a frequency response analyzer. The ionic conductivity at room temperature was measured by an electrochemical impedance measurement method.

Figure 5:
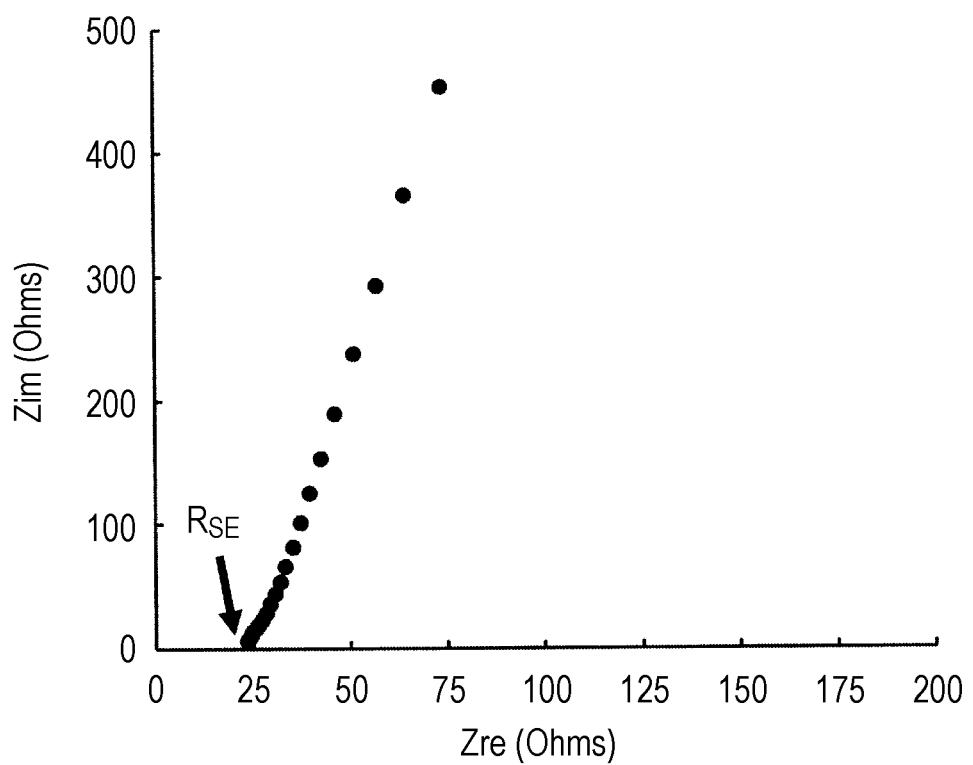
FIG. 5 is a graph showing the results of evaluation of ionic conductivity by AC impedance measurement.

FIG. 5 is a graph showing the results of evaluation of ionic conductivity by AC impedance measurement. FIG. 5 shows a Cole-Cole diagram of the impedance measurement results.

In FIG. 5, the value of the real part of the impedance at the measurement point (indicated by an arrow in FIG. 5) having the smallest absolute value of the phase of the complex impedance was considered as a resistance value for the ionic conduction of the solid electrolyte of Example 1. The ionic conductivity was calculated from the following formula (1) using the resistance value of the electrolyte.

$$\sigma = (R_{SE} \times S/t)^{-1} \quad (1)$$

where $\sigma$ is the ionic conductivity, S is the area of the electrolyte (in FIG. 4, the inside diameter of the die 201), $R_{SE}$ is the resistance value of the solid electrolyte in the above-mentioned impedance measurement, and t is the thickness of the electrolyte (in FIG. 4, the thickness of the solid electrolyte powder 100).

The ionic conductivity of the solid electrolyte material of Example 1 measured at 22° C. was 5.7×10$^{-3}$ S/cm.

Examples 2 to 24

(Production of Solid Electrolyte Material)
In Examples 2 to 16, as in Example 1, in an argon atmosphere with a dew point of lower than or equal to −60° C., LiBr, LiI, YBr$_3$, and YCl$_3$ were weighed so as to satisfy a molar ratio of LiBr:LiI:YBr$_3$:YCl$_3$=1:2:0.33:0.67.

In Example 17, in an argon atmosphere with a dew point of lower than or equal to −60° C., LiBr, LiCl, LiI, and YCl$_3$ were weighed so as to satisfy a molar ratio of LiBr:LiCl:LiI:YCl$_3$=4:1:4:1.

In Example 18, in an argon atmosphere with a dew point of lower than or equal to −60° C., LiI, YBr$_3$, YCl$_3$, and YI$_3$ were weighed so as to satisfy a molar ratio of LiI:YBr$_3$:YCl$_3$:YI$_3$=1.5:0.67:0.67:0.17.

In Example 19, in an argon atmosphere with a dew point of lower than or equal to −60° C., LiBr, LiI, YBr$_3$, and YCl$_3$ were weighed so as to satisfy a molar ratio of LiBr:LiI:YBr$_3$:YCl$_3$=1.35:1.65:0.33:0.67.

In Example 20, in an argon atmosphere with a dew point of lower than or equal to −60° C., LiBr, LiI, and YCl$_3$ were weighed so as to satisfy a molar ratio of LiBr:LiI:YCl$_3$=2:1:1.

In Example 21, in an argon atmosphere with a dew point of lower than or equal to −60° C., LiBr, LiCl, LiI, and YCl$_3$ were weighed so as to satisfy a molar ratio of LiBr:LiCl:LiI:YCl$_3$=4:1:1:2.

In Example 22, in an argon atmosphere with a dew point of lower than or equal to −60° C., LiBr, LiCl, LiI, and YCl$_3$ were weighed so as to satisfy a molar ratio of LiBr:LiCl:LiI:YCl$_3$=1:1:1:1.

In Example 23, in an argon atmosphere with a dew point of lower than or equal to −60° C., LiBr, LiCl, LiI, and YCl$_3$ were weighed so as to satisfy a molar ratio of LiBr:LiCl:LiI:YCl$_3$=1:1.5:0.5:1.

In Example 24, in an argon atmosphere with a dew point of lower than or equal to −60° C., LiBr, LiCl, LiI, and YCl$_3$ were weighed so as to satisfy a molar ratio of LiBr:LiCl:LiI:YCl$_3$=0.5:2:0.5:1.

These materials were pulverized and mixed with a mortar made of agate.

The resulting mixture was placed in a crucible made of alumina, heated to 200 to 500° C. in an argon atmosphere, and held for 1 to 24 hours. In each Example, the "intended composition", "heat-treatment temperature", and "heat-treatment time" are shown in Table 1 below.

After heat-treatment under the corresponding heat-treatment conditions, pulverization was performed with a mortar made of agate to produce a solid electrolyte material of each of Examples 2 to 24.

(Evaluation of Ionic Conductivity)
By the same method as that of Example 1 described above, a conductivity measurement cell of each of Examples 2 to 24 was produced, and measurement of ionic conductivity was performed.

Comparative Example 1

(Production of Solid Electrolyte Material)
In Comparative Example 1, in an argon atmosphere with a dew point of lower than or equal to −60° C., LiBr, LiI, YBr$_3$, and YCl$_3$ were weighed so as to satisfy a molar ratio of LiBr:LiI:YBr$_3$:YCl$_3$=1:2:0.33:0.67. These materials were pulverized and mixed with a mortar made of agate. The resulting mixture was placed in a crucible made of alumina, heated to 150° C. in an argon atmosphere, and held for one hour. After heat-treatment, the material was pulverized with a mortar made of agate to produce a solid electrolyte material of Comparative Example 1.

(Evaluation of Ionic Conductivity)

By the same method as that of Example 1 described above, a conductivity measurement cell of Comparative Example 1 was produced, and measurement of ionic conductivity was performed.

The compositions and the evaluation results in Examples 1 to 24 and Comparative Example 1 are shown in Table 1.

TABLE 1

| | Molar mixing ratio of starting materials | | | | | | Heat-treatment temperature | Heat-treatment | Conductivity |
|---|---|---|---|---|---|---|---|---|---|
| | LiBr | LiCl | LiI | YBr$_3$ | YCl$_3$ | YI$_3$ | Composition | (° C.) | time (hr) | (S · cm$^{-1}$) |
| Example 1 | 1 | | 2 | 0.33 | 0.67 | | Li$_3$YBr$_2$Cl$_2$I$_2$ | 440 | 1 | 5.7 × 10$^{-3}$ |
| Example 2 | 1 | | 2 | 0.33 | 0.67 | | Li$_3$YBr$_2$Cl$_2$I$_2$ | 200 | 1 | 7.0 × 10$^{-5}$ |
| Example 3 | 1 | | 2 | 0.33 | 0.67 | | Li$_3$YBr$_2$Cl$_2$I$_2$ | 250 | 1 | 5.2 × 10$^{-5}$ |
| Example 4 | 1 | | 2 | 0.33 | 0.67 | | Li$_3$YBr$_2$Cl$_2$I$_2$ | 300 | 1 | 5.7 × 10$^{-3}$ |
| Example 5 | 1 | | 2 | 0.33 | 0.67 | | Li$_3$YBr$_2$Cl$_2$I$_2$ | 350 | 1 | 4.1 × 10$^{-4}$ |
| Example 6 | 1 | | 2 | 0.33 | 0.67 | | Li$_3$YBr$_2$Cl$_2$I$_2$ | 380 | 1 | 4.6 × 10$^{-3}$ |
| Example 7 | 1 | | 2 | 0.33 | 0.67 | | Li$_3$YBr$_2$Cl$_2$I$_2$ | 400 | 1 | 4.9 × 10$^{-3}$ |
| Example 8 | 1 | | 2 | 0.33 | 0.67 | | Li$_3$YBr$_2$Cl$_2$I$_2$ | 460 | 1 | 3.7 × 10$^{-3}$ |
| Example 9 | 1 | | 2 | 0.33 | 0.67 | | Li$_3$YBr$_2$Cl$_2$I$_2$ | 480 | 1 | 4.6 × 10$^{-3}$ |
| Example 10 | 1 | | 2 | 0.33 | 0.67 | | Li$_3$YBr$_2$Cl$_2$I$_2$ | 500 | 1 | 5.3 × 10$^{-3}$ |
| Example 11 | 1 | | 2 | 0.33 | 0.67 | | Li$_3$YBr$_2$Cl$_2$I$_2$ | 400 | 3 | 5.0 × 10$^{-3}$ |
| Example 12 | 1 | | 2 | 0.33 | 0.67 | | Li$_3$YBr$_2$Cl$_2$I$_2$ | 400 | 10 | 4.7 × 10$^{-3}$ |
| Example 13 | 1 | | 2 | 0.33 | 0.67 | | Li$_3$YBr$_2$Cl$_2$I$_2$ | 400 | 24 | 2.2 × 10$^{-3}$ |
| Example 14 | 1 | | 2 | 0.33 | 0.67 | | Li$_3$YBr$_2$Cl$_2$I$_2$ | 440 | 3 | 7.1 × 10$^{-3}$ |
| Example 15 | 1 | | 2 | 0.33 | 0.67 | | Li$_3$YBr$_2$Cl$_2$I$_2$ | 440 | 5 | 5.5 × 10$^{-3}$ |
| Example 16 | 1 | | 2 | 0.33 | 0.67 | | Li$_3$YBr$_2$Cl$_2$I$_2$ | 440 | 10 | 5.1 × 10$^{-3}$ |
| Example 17 | 4 | 1 | 4 | | 1 | | Li$_{4.5}$Y$_{0.6}$Br$_2$Cl$_2$I$_2$ | 440 | 1 | 9.1 × 10$^{-4}$ |
| Example 18 | | 1.5 | 0.67 | 0.67 | | 0.17 | Li$_{1.5}$Y$_{1.5}$Br$_2$Cl$_2$I$_2$ | 440 | 1 | 4.9 × 10$^{-3}$ |
| Example 19 | 1.35 | | 1.65 | 0.33 | 0.67 | | Li$_3$YBr$_{2.35}$Cl$_2$I$_{1.65}$ | 460 | 3 | 7.3 × 10$^{-3}$ |
| Example 20 | 2 | | 1 | 1 | | | Li$_3$YBr$_2$Cl$_3$I | 460 | 3 | 5.0 × 10$^{-3}$ |
| Example 21 | 4 | 1 | 1 | | 2 | | Li$_3$YBr$_2$Cl$_{3.5}$I$_{0.5}$ | 460 | 3 | 2.7 × 10$^{-3}$ |
| Example 22 | 1 | 1 | 1 | | 1 | | Li$_3$YBrCl$_4$I | 460 | 3 | 2.4 × 10$^{-3}$ |
| Example 23 | 1 | 1.5 | 0.5 | | 1 | | Li$_3$YBrCl$_{4.5}$I$_{0.5}$ | 460 | 3 | 2.7 × 10$^{-3}$ |
| Example 24 | 0.5 | 2 | 0.5 | | 1 | | Li$_3$YBr$_{0.5}$Cl$_5$I$_{0.5}$ | 460 | 3 | 1.5 × 10$^{-3}$ |
| Comparative Example 1 | 1 | | 2 | 0.33 | 0.67 | | Li$_3$YBr$_2$Cl$_2$I$_2$ | 150 | 1 | 3.4 × 10$^{-8}$ |

<Considerations>

As in Comparative Example 1, in the case where the heat-treatment temperature is 150° C., the ionic conductivity at around room temperature is low at 3.4×10$^{-8}$ S/cm. The reason for this is considered to be that in the case where the heat-treatment temperature is 150° C., the solid phase reaction is insufficient. In contrast, in Examples 1 to 24, the ionic conductivity at around room temperature is high at more than or equal to 5.2×10$^{-5}$ S/cm. Furthermore, in the case where the heat-treatment temperature is in the range of 380 to 500° C., a higher ionic conductivity is exhibited. The reason for this is considered to be that a solid electrolyte having high crystallinity has been achieved.

From the above results, it is evident that the solid electrolyte material synthesized by the production method according to the present disclosure has high lithium ion conductivity. Furthermore, the production method according to the present disclosure is a simple and easy method and a method having industrially high productivity.

The production method according to the present disclosure can be used, for example, as a production method for producing a solid electrolyte material. Furthermore, the solid electrolyte material produced by the production method according to the present disclosure can be used, for example, in all-solid-state lithium secondary batteries.

What is claimed is:

1. A production method, comprising:
   producing a halide by heat-treating, in an inert gas atmosphere, a mixed material in which LiX, YZ$_3$, and at least one of LiX' or YZ'$_3$ are mixed, wherein:
   X is an element selected from the group consisting of Cl, Br, and I,
   Z is an element selected from the group consisting of Cl, Br, and I, and different from X,
   X' is an element selected from the group consisting of Cl, Br, and I, and different from either X or Z; and Z' is an element selected from the group consisting of Cl, Br, and I and different from either X or Z, and
   the mixed material is heat-treated at higher than or equal to 200° C. and lower than or equal to 650° C.

2. The production method according to claim 1, wherein the mixed material is mixed with LiX'.

3. The production method according to claim 2, wherein the mixed material is further mixed with LiZ.

4. The production method according to claim 2, wherein the mixed material is heat-treated at higher than or equal to 200° C. and lower than or equal to 500° C.

5. The production method according to claim 4, wherein the mixed material is heat-treated at higher than or equal to 380° C.

6. The production method according to claim 2, wherein the mixed material is heat-treated for more than or equal to 1 hour and less than or equal to 24 hours.

7. The production method according to claim 6, wherein the mixed material is heat-treated for less than or equal to 10 hours.

8. The production method according to claim 1, wherein the mixed material is mixed with YZ'$_3$.

9. The production method according to claim 8, wherein the mixed material is further mixed with YX$_3$.

10. The production method according to claim 1, wherein the mixed material is further mixed with $M_\alpha A_\beta$,
   where M includes at least one element selected from the group consisting of Na, K, Ca, Mg, Sr, Ba, Zn, In, Sn, Bi, La, Ce, Pr, Nd, Pm, Sm, Eu, Gd, Tb, Dy, Ho, Er, Tm, Yb, and Lu;
   A is at least one element selected from the group consisting of Cl, Br, and I; and
   $\alpha > 0$ and $\beta > 0$ are satisfied.

11. The production method according to claim 1, wherein the mixed material is further mixed with at least one of LiF or $YF_3$.

12. The production method according to claim 1, wherein the halide includes Li, Y, Cl, Br and I.

13. The production method according to claim 1, wherein the halide is a solid electrolyte.

* * * * *